United States Patent
Uehara et al.

(10) Patent No.: US 9,205,834 B1
(45) Date of Patent: Dec. 8, 2015

(54) RECONFIGURABLE SYSTEM WITH MINIMUM MOBILITY MODE

(71) Applicant: Toyota Motor Engineering & Manufacturing North America, Inc., Erlanger, KY (US)

(72) Inventors: Yasuo Uehara, Ann Arbor, MI (US); Danil Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/318,385

(22) Filed: Jun. 27, 2014

(51) Int. Cl.
  *B60L 9/00* (2006.01)
  *B60L 11/00* (2006.01)
  *B60W 10/00* (2006.01)
  *B60W 20/00* (2006.01)
  *B60W 10/06* (2006.01)
  *B60W 10/08* (2006.01)

(52) U.S. Cl.
  CPC .............. *B60W 20/50* (2013.01); *B60W 10/06* (2013.01); *B60W 10/08* (2013.01); *B60W 20/20* (2013.01); *Y10S 903/93* (2013.01)

(58) Field of Classification Search
  CPC ..... B60W 20/50; B60W 20/20; B60W 10/06; B60W 10/08; Y10S 903/93
  See application file for complete search history.

(56) References Cited

U.S. PATENT DOCUMENTS

| | | | |
|---|---|---|---|
| 6,276,473 B1 * | 8/2001 | Zur Megede | 180/65.25 |
| 6,405,818 B1 * | 6/2002 | Anthony | B60K 6/365 |
| | | | 180/65.235 |
| 6,885,920 B2 | 4/2005 | Yakes et al. | |
| 7,471,003 B2 | 12/2008 | Kobayashi et al. | |
| 8,249,770 B2 | 8/2012 | Bennewitz | |
| 8,509,977 B2 | 8/2013 | Allgaier et al. | |
| 8,548,658 B2 | 10/2013 | Rollmann et al. | |

(Continued)

FOREIGN PATENT DOCUMENTS

| | | |
|---|---|---|
| CA | 1289892 | 10/1991 |
| WO | WO 9947794 | 9/1999 |

(Continued)

OTHER PUBLICATIONS

Silveira, et al.; "Survey on Fault-Tolerant Diagnosis and Control Systems Applied to Multi-Motor Electric Vehicles"; DoCEIS 2011, IFIP AICT 349; pp. 359-366, 2011.

(Continued)

*Primary Examiner* — Spencer Patton
*Assistant Examiner* — Robert Nguyen
(74) *Attorney, Agent, or Firm* — Snell & Wilmer LLP (57) ABSTRACT

A method includes detecting a fault of a component of a vehicle. The method also includes providing a plurality of modes of operation for the vehicle including an engine only mode, an electric only mode, a hybrid mode, a partial engine only mode, a partial electric only mode and a partial hybrid mode. At least two of the plurality of modes of operation that avoid use of the faulty component are displayed on a display screen, and a selection of one of the at least two of the plurality of modes of operation that are displayed on the display screen is received. The method includes activating at least one electric, mechanical or software isolator to isolate or disengage at least one component associated with electric propulsion of the vehicle or at least one component associated with combustion engine propulsion of the vehicle that includes the faulty component.

20 Claims, 7 Drawing Sheets

(56) References Cited

U.S. PATENT DOCUMENTS

| | | | |
|---|---|---|---|
| 8,761,994 B2 * | 6/2014 | Mikulec et al. | 701/29.1 |
| 2004/0174125 A1 | 9/2004 | Wilton et al. | |
| 2010/0305792 A1 | 12/2010 | Wilk et al. | |
| 2012/0109435 A1 | 5/2012 | Mikulec et al. | |
| 2013/0066510 A1 | 3/2013 | Lasson | |
| 2014/0074335 A1 * | 3/2014 | Krauss | B60W 20/50 701/22 |
| 2014/0114523 A1 * | 4/2014 | Hirasawa | B60K 6/445 701/22 |
| 2014/0297115 A1 * | 10/2014 | Kang et al. | 701/37 |

FOREIGN PATENT DOCUMENTS

| | | |
|---|---|---|
| WO | WO 2004/073156 | 8/2004 |
| WO | WO 2012177243 | 12/2012 |
| WO | WO 2013/158083 | 10/2013 |

OTHER PUBLICATIONS http://en.wikipedia.org/wiki/Damage_tolerance; 3 pages; Jun. 27, 2014.

http://en.wikipedia.org/wiki/Fly-by-wire; 10 pages; Jun. 27, 2014.

http://en.wikipedia.org/wiki/Reconfigurable_computing; 7 pages; Jun. 27, 2014.

http://www.peakprosperity.com/wsidblog/79974/running-inteverter-prius-backup-power; 6 pages; Jun. 27, 2014.

* cited by examiner

FIG. 8

RECONFIGURABLE SYSTEM WITH MINIMUM MOBILITY MODE

BACKGROUND

1. Field

The present invention relates to a system and a method for reconfiguring the source of propulsion of a vehicle comprising multiple propulsion systems.

2. Description of the Related Art

Hybrid and plug-in hybrid vehicles (HEV) present a useful combination of two forms of vehicular propulsion within the same vehicle, such as a combustion engine system and an electric system. In principle, by providing more than one system for vehicle propulsion, reliability and robustness of the overall vehicle propulsion system should be increased. If a failure occurs in a first propulsion system it should be possible to provide vehicular mobility from a second propulsion system. This is not always the case.

Current technologies sometimes provide various limp-home vehicle modes when a fault is detected within a portion of the hybrid vehicle's propulsion system. For example, if a fault is detected within an electric motor-generator portion of the hybrid vehicle, placing the vehicle into a limp-home mode may cause vehicle propulsion to be provided by the combustion engine system only.

Even if a split configuration HEV was configured to operate in these limp-home modes, this feature can be improved. Using a limp-home mode, if a fault is detected within the electric system of a HEV, then the combustion engine system of the HEV will activate and be the sole propulsion-generating system of the hybrid vehicle until the fault is repaired. This means that the entire electric system of the hybrid vehicle is unavailable. This is not always necessary, and it may be beneficial for a hybrid vehicle in this state to utilize some aspects of the electric motor-generator. For example, in this state, an HEV could still operate in a partial hybrid mode, thus requiring less fuel and/or placing less strain on the engine. Continuing the example, let's further assume that a cylinder of the internal combustion engine is not functioning properly. Any current limp-mode technology would simply eliminate the internal combustion engine system.

Furthermore, the user of the HEV may have a preference of mobility modes when a fault is detected. For example, the user may want to prevent strain on a particular portion of the propulsion system, or the user may want to save fuel and/or charge. This is particularly true if the stored fuel levels and/or the state of charge are low and the vehicle is not near a fuel, plugin or repair station. Current systems do not allow for any user input when changing the propulsion source of the hybrid vehicle after a fault is detected.

Thus, there is a need for methods and systems for reconfiguring hybrid vehicle systems with minimum mobility modes.

SUMMARY

This summary is included to introduce, in an abbreviated form, various topics to be elaborated upon below in the Detailed Description.

A system and a method for reconfiguring the operations of a vehicle are described. The method includes detecting, using a sensor, a fault of a component that is associated with electric propulsion of the vehicle or combustion engine propulsion of the vehicle. The method also includes providing, using a processor, a plurality of modes of operation for the vehicle, where the plurality of modes of operation of the vehicle include an engine only mode, an electric only mode, a hybrid mode, a partial engine only mode, a partial electric only mode and a partial hybrid mode. At least two of the plurality of modes of operation that avoid use of the faulty component are displayed on a display screen, and a selection of one of the at least two of the plurality of modes of operation that are displayed on the display screen is received using the processor. The method includes activating, using a processor, at least one electric, mechanical or software isolator to disable at least one component associated with electric propulsion of the vehicle that includes the faulty component or at least one component associated with combustion engine propulsion of the vehicle that includes the faulty component.

A system includes a sensor for detecting a fault of a component that is associated with electric propulsion of the vehicle or combustion engine propulsion of the vehicle. A display screen is also included. The system includes a processor configured to provide the plurality of modes of operation for the vehicle, the plurality of modes of operation including an engine only mode, an electric only mode, a hybrid mode, a partial engine only mode, a partial electric only mode and a partial hybrid mode. The processor is further configured to instruct the display screen to display at least two of the plurality of modes of operation that avoid use of the faulty component. The processor is also configured to receive a selection of one of the at least two of the plurality of modes of operation that are displayed on the display screen. The processor further configured to activate at least one electric, mechanical or software isolator to isolate at least one component associated with electric propulsion of the vehicle that includes the faulty component or at least one component associated with combustion engine propulsion of the vehicle that includes the faulty component.

Another method for reconfiguring the operations of a vehicle is described. The method includes detecting, using a sensor, a fault of a component that is associated with a first method of propulsion of the vehicle or a second method of propulsion of the vehicle. The method also includes providing, using a processor, a plurality of modes of operation for the vehicle. The plurality of modes of operation include a first method of propulsion only mode, a second method of propulsion only mode, a partial first method of propulsion only mode, a partial second method of propulsion only mode, and a partial combination of the first method of propulsion and the second method of propulsion. The method further includes displaying, using a display screen, at least two of the plurality of modes of operation that avoid use of the faulty component. The method also includes receiving, using the processor, a selection of one of the at least two of the plurality of modes of operation that are displayed on the display screen. Also, activating, using the processor, at least one electric, mechanical or software isolator to include at least one component associated with the first method of propulsion of the vehicle or at least one component associated with the second method of propulsion of the vehicle that includes the faulty component is included.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements. A connection, when mentioned in this document, may refer to any communication channel between modules, components, parts, etc., and may be a physical connection via hardware or may be a logical software connection within the processors. The communications may occur via a wired connection, a wireless connection, or a combination of wired and wireless.

Key benefits are provided by the embodiments described herein. For example, using a system described below, if a key component in an electrical system or a combustion system of a hybrid vehicle fails, the component can be isolated so that the vehicle can still be provided power. Another advantage is that the system can select an optimal configuration of available working parts in order to prevent wear and tear of the vehicle, optimize performance and optimize energy efficiency. Yet another advantage is that a user can select from different configurations of available working parts in order to obtain results for his particular situation. The ability to select from available configurations also allows for easier troubleshooting of the vehicle, as components can be more easily isolated for testing purposes.

An important feature of the present invention is the use of isolators. The type and placement of the isolators allow for a multitude of different configurations of components to be configured to provide different mobility modes. The ability of the processor to determine optimal mobility modes is another key feature. Yet another key feature is the ability of the vehicle to operate in backup mobility modes, such as utilizing 5 cylinders of a 6-cylinder engine when one cylinder is misfiring.

This document refers to hybrid vehicles. While the illustrations herein illustrate a hybrid vehicle having an electric propulsion system and a combustion engine propulsion system, one skilled in the art will realize that the embodiments described herein can be applied to a hybrid vehicle utilizing any two or more propulsion systems. Examples of propulsion systems that may be found in a hybrid vehicle for purposes of this document include: electric systems utilizing different sources of electricity (such as solar, vehicle-generated and/or plug-in energy sources), internal combustion engine systems using petroleum-based fuels, fuel cell systems (such as hydrogen-fueled systems or zero-carbon hydrogen-fueled systems), and systems utilizing other advanced biofuels (such as ethanol and bio-diesel). It will also be understood that a hybrid vehicle may refer to a traditional hybrid vehicle, a plug-in hybrid vehicle, or any other configuration of a hybrid vehicle.

Figure 1A:
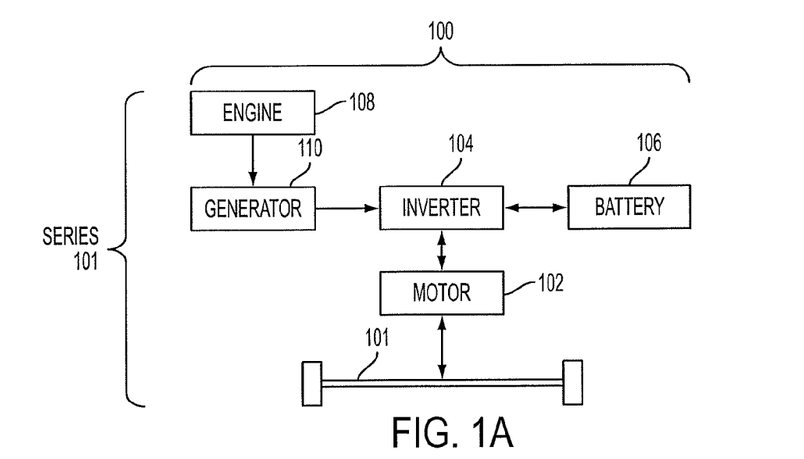
FIG. 1A illustrates a series configuration of a hybrid vehicle.
Figure 1B:
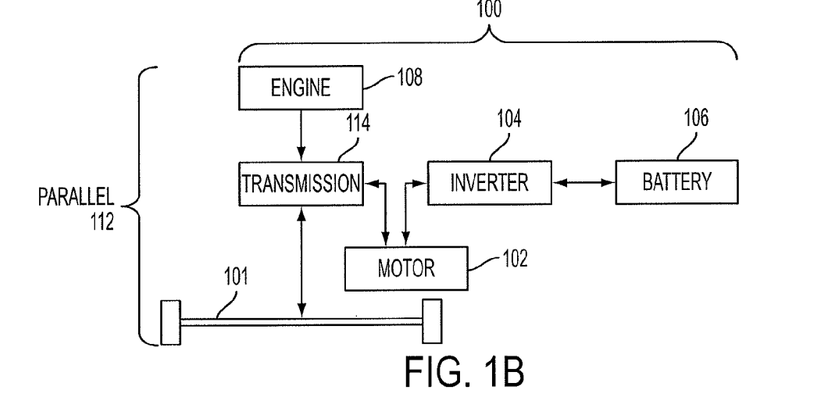
FIG. 1B illustrates a parallel configuration of a hybrid vehicle.
Figure 1C:
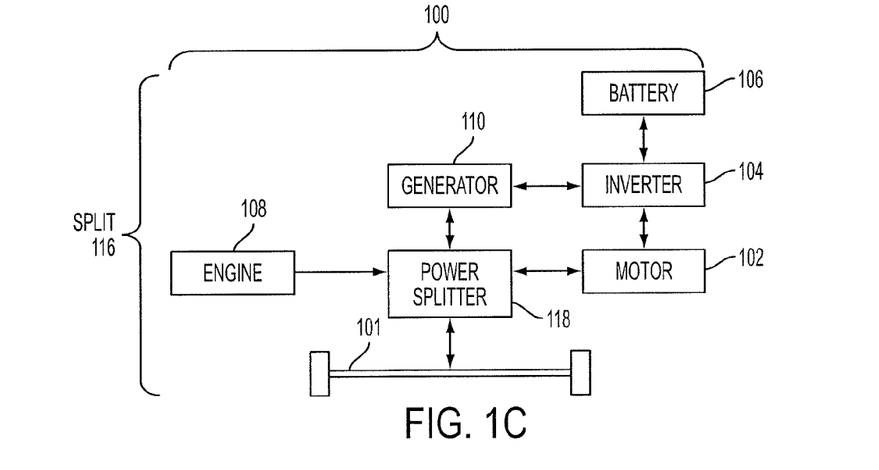
FIG. 1C illustrates a split configuration of a hybrid vehicle.

FIGS. 1A, 1B and 1C illustrate three common configurations of hybrid vehicles. FIG. 1A illustrates a series configuration 101 of a hybrid vehicle 100. Series configurations 101 are typically used for hybrid vehicles 100 where one propulsion system is the preferred, or main, energy source and the other propulsion system is a backup. In the example illustrated in FIG. 1A, the electric propulsion system may be the main energy source and the combustion engine propulsion system may be the backup energy source, or vice versa.

In FIG. 1A, the axle 101 is driven by an electric motor-generator (motor-generator) 102, which receives power through an inverter 104. When referenced herein, a motor-generator may refer to a single motor-generator, a combination of motor-generators, or any combination of motor(s) and/or generator(s). Energy for the electric propulsion system is stored in the battery and/or capacitor or other electrical storage device (battery) 106, where it can be transferred through the inverter 104 to the motor-generator 102. The inverter 104 may be configured to convert direct current (DC) power to alternating current (AC) power and/or AC power to DC power. For example, the battery 106 may store energy in DC form, but the motor-generator 102 may function by utilizing AC energy. In this situation, the inverter 104 can transform the DC energy in the battery 106 to the AC power required by the motor-generator 102. Additionally, when the hybrid vehicle 100 is decelerating or traveling downhill, a motor-generator 102 can generate electric energy from kinetic energy and the inverter 104 can transform this AC power into DC energy so that the battery 106 can store the energy.

The series configuration 101 also includes a combustion engine system as a secondary (or main) power source. An internal combustion engine (engine) 108 provides energy to the generator 110 which converts the energy produced by the engine 108 from mechanical to electrical. From the generator 110, the energy can be applied by the motor-generator 102 via the inverter 104 to the axle 101 for propulsion, or stored in the battery 106 (the battery 106 may be charged by the inverter 104).

FIG. 1B illustrates a parallel configuration 112 of a hybrid vehicle 100. In the parallel configuration 112, energy is created by the engine 108. This mechanical energy may be applied through a transmission 114 to the axle 101 in order to propel the hybrid vehicle 100. Likewise, a battery 106 stores energy which may be applied through the inverter 104 and converted into power by the motor-generator 102 so the transmission 114 can apply the power to the axle 101 in order to propel the hybrid vehicle 100. As illustrated in FIG. 1B, either the combustion engine system or the electric system may provide energy to propel the hybrid vehicle 100. One system is not required to be in operation in order for the other system to propel the hybrid vehicle 100, so long as the transmission 114 is configured to handle both types of energy at the same or separate time intervals.

Because the power is provided in a parallel configuration, output from the transmission 114 must be identical from both the engine 108 and the motor-generator 102, and the supplied torques add together. Therefore, when only one of the engine 108 or the motor-generator 102 is providing vehicular power, the other must be isolated or be disengaged by a clutch, or freewheel. An alternate embodiment of a parallel configuration would be the situation where a combustion engine system is configured to power one axle of the hybrid vehicle 100 and the electric system is configured to power the other axle of the hybrid vehicle 100. A parallel configuration 112 may also include a generator 110, or the motor-generator 102 as the generator 110. In this configuration, the engine 108 can generate mechanical energy and the generator 110 can convert the mechanical energy into electrical energy for storage in the battery 106 via the inverter 104.

FIG. 1C illustrates a split configuration 116 of a hybrid vehicle 100. In the split configuration 116, energy may again be generated from the engine 108 and/or stored in the battery 106. The battery 106 stores energy. This stored energy can be applied through the inverter 104 to the motor-generator 102 to be used as mechanical power to propel the hybrid vehicle 100. The generator 110 may be used to convert mechanical kinetic energy of the hybrid vehicle 100 to electric energy which can be stored in the battery 106 and/or used by the motor-generator 102. The generator 110 may also be used to convert mechanical energy created by the engine 108 into electrical energy to be used by the motor-generator 102 and/or stored in the battery 106.

In this configuration, there is a combustion system which includes the engine 108 and/or the generator 110, and an electric system which includes the motor-generator 102, the inverter 104, the battery 106 and/or the generator 110. Propulsion power may be provided to the hybrid vehicle 100 by the combustion system, the electric system, or a combination of the two.

Power from the engine 108 and the motor-generator 102 is applied to a power splitter 118. The power splitter 118 can request and/or apply any amount of propulsion power from either the engine 108 or the motor-generator 102. For example, 20% of the propulsion power may be provided by the engine 108 and the other 80% applied by the motor-generator 102; 50% of the propulsion power may be applied by either; or any other division of power may be applied.

One skilled in the art will realize that any of these configurations of the hybrid vehicle 100 may include more or less components than illustrated. One skilled in the art will also realize that the components also include parts. For example, a spark plug is a part of the engine 108, a battery pack is part of the battery 106, etc. The hybrid vehicle configurations mentioned herein specifically refer to configurations including a combustion engine system and an electric system. However, one skilled in the art will realize that these configurations may be utilized using any two propulsion systems. So, for example, a hybrid vehicle as mentioned herein may utilize a series hybrid configuration of the hybrid vehicle 100 utilizing an electric system and a fuel cell system, a split configuration of the hybrid vehicle 100 utilizing a fuel cell system and a combustion engine system, or any other combination of configurations and/or propulsion systems.

The systems and methods discussed in this document will be illustrated in regards to the split configuration 116 of the hybrid vehicle 100 utilizing an electric system and a combustion engine system. However, one skilled in the art will realize that these systems and methods can be applied to any other hybrid vehicle 100 configuration, such as the series configuration 101, the parallel configuration 112, or any other configuration utilizing any combination of two or more propulsion systems.

Figure 2:
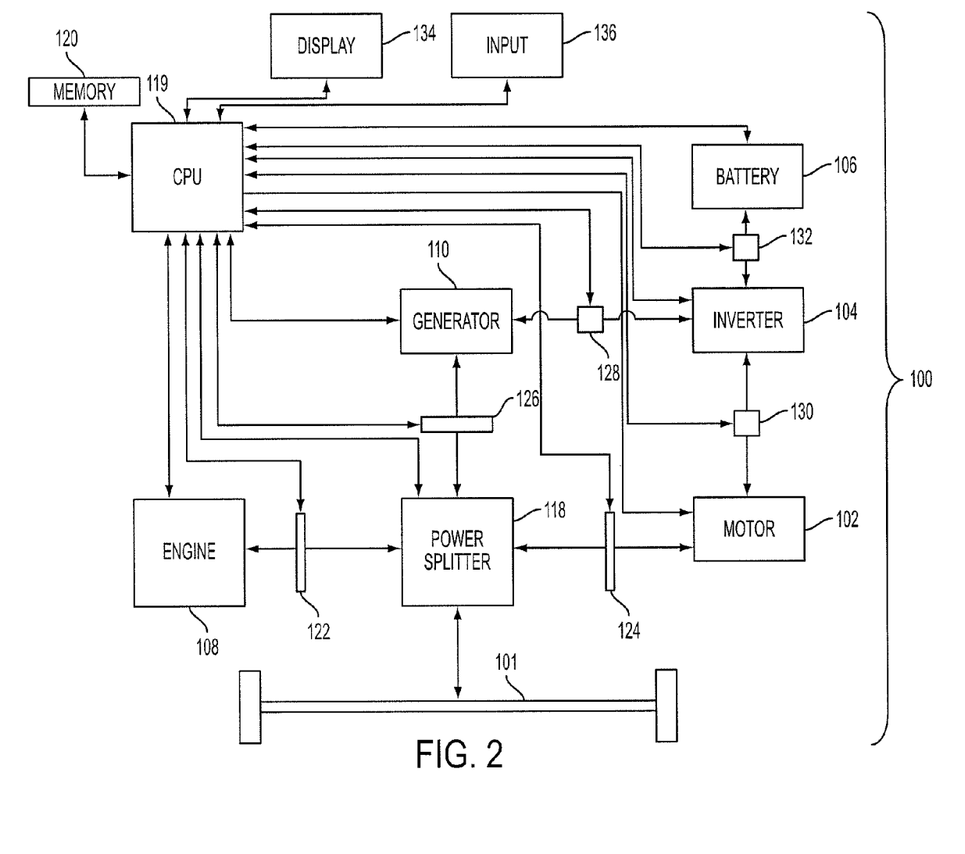
FIG. 2 illustrates one embodiment of a hybrid vehicle utilizing systems for reconfigurable mobility modes.

FIG. 2 illustrates one embodiment of a hybrid vehicle 100 utilizing reconfigurable mobility modes. All of the elements illustrated in FIG. 1C are also illustrated in FIG. 2. FIG. 2 further illustrates a CPU 119 connected to a memory 120. The CPU 119 is also connected to the battery 106, the inverter 104, the motor-generator 102, the generator 110, the power splitter 118 and the engine 108. The CPU 119 or any other processor mentioned herein may be a general purpose processor, a digital signal processor (DSP), an application specific integrated circuit (ASIC), a field programmable gate array (FPGA) or other programmable logic device, discrete gate or transistor logic, discrete hardware components, or any combination thereof. The CPU 119 may be a stand-alone device or may be contained within another vehicle component, such as an electronic control unit. The CPU 119 may also be positioned remote from the hybrid vehicle 100 and accessed wirelessly.

The memory 120 may be any device configured to store data. For example, a memory may be a ROM, a physical or a virtual RAM, a register within a processor, removable drives, network or cloud storage, a hard drive, or any other memory device. The memory 120 may also be positioned within or on the hybrid vehicle 100 and accessed through a physical or wireless connection. The memory 120 may also be positioned remote from the hybrid vehicle 100 and accessed wirelessly.

All or some of the components of the hybrid vehicle 100, and/or any parts or features of any components, may include or be associated with at least one fault detector. The fault detector may include any type of fault detector, such as implemented in software, hardware, electromechanical, mechanical, or any combination of the above.

In some embodiments, the fault detector may include one or more sensor, such as a digital or analog thermometer, a thermocouple, an ohmmeter, a voltmeter, an ammeter, alternating current signal sensor, a capacitance sensor, an inductance sensor, a pressure sensor, a microphone, an air-fuel ration meter, a crankshaft position sensor, a hall effect sensor, a MAP sensor, a mass flow sensor, an oxygen sensor, a throttle position sensor, a torque sensor, a turbine speed sensor, a variable reluctance sensor, a water sensor, a state of charge (SOC) sensor, a motion sensor, a microphone, and the like.

In some embodiments, these sensors may be positioned within vehicular components. For example, the battery 108 may contain a voltmeter, ammeter and/or any other sensor within it. In other embodiments, these sensors may be positioned outside of the vehicular components. For example, the motor-generator 102 may be coupled to a thermometer positioned outside of the motor-generator 102. In other embodiments, some of these sensors may be positioned within the vehicular components and others may be positioned outside of the vehicular components. For example, the generator 110 may contain a voltmeter and an ammeter within it and may be coupled to a thermometer external to the generator 110. In some embodiments, the sensors may be within or external to a part of a component, such as in a cylinder of the engine 108 or in a particular battery pack of the battery 106.

The sensors may be coupled to a device which provides logic. The logic function may use the output of the sensor as input to the logic function(s). The logic may be implemented in software, hardware, firmware or any combination. For example, the logic may be performed by the CPU 119; by a processor within the sensor or combined with the sensor; in another processor or processors within the hybrid vehicle 100; in an electronic control unit, which may include a processor, connected to the electrical propulsion system; in an electronic control unit, which may include a processor, connected to the combustion engine propulsion system; or in a processor or processors remote from the hybrid vehicle 100 and connected wirelessly. This combination of a sensor and logic may be considered a fault detector.

The logic function may compare a measured value with an expected value or a range of expected values. These expected values may be stored in a memory in the logic function device, in the memory 120, in a memory remote from the hybrid vehicle 100, or may be generated by a system within the hybrid vehicle 100 or remote from the hybrid vehicle 100 (such as by using current data of the hybrid vehicle 100 to generate the value or range or by receiving pre-selected expected value information from a remote device). If the measured value is not within the stored or generated expected range or is not the expected value and/or near the expected value, then the logic function may output that a fault has occurred. The logic function, the CPU 119 or any other processing device may be configured to determine the type of fault and/or the location of the fault based on the measured value from the sensor and the expected value and/or range of expected values.

A fault detector may be any combination of a sensor or sensors, a processor or processors and a memory or memories. For example, each sensor may be coupled to a processor such that the sensor will detect values and the processor will determine, by comparing the measured value to a value stored in a memory coupled to the processor, if a fault has occurred or not. As another example, the sensors may be connected to the CPU 119 which will compare the measured values to stored values in the memory 120.

The fault detectors may detect many types of faults and failures. For example, the system may detect a fault or failure of the battery 106, of the inverter 104, of the motor-generator 102, of the generator 110, of the power splitter 118, of the engine 108, or of any other component of the hybrid vehicle 100, illustrated or not. Other components may include, for example, electronic control units for one or both of the propulsion systems (in the example illustrated in FIG. 2, the propulsion systems include the electric system and the combustion engine system), other control units, electric relays, energy converters, alternate batteries, air compressors, pumps, capacitors, supercapacitors, other motors, rotors, belts, exhaust systems, valves, converters, gears, chains, fuel reservoir, etc. The fault detectors may also detect different kinds of faults, such as a battery 106 overheating event, a battery 106 voltage spike event, a misfiring cylinder of the engine 108, etc.

The system may detect faults or failures of any parts or features of the components of the hybrid vehicle 100 as well. For example, the system may detect a fault or failure of a cylinder, an alternator, a spark plug, a belt, a valve, a piston, a battery pack, a single motor within a motor system, or any other part or feature of any component.

FIG. 2 further illustrates mechanical isolators 122, 124 and 126, and electrical isolators 128, 130, and 132. Isolators 122, 124, 126, 128, 130 and 132 utilized within the hybrid vehicle 100 may be mechanical isolators 122, 124 or 126, or electrical isolators 128, 130 and 132. The electric isolators 128, 130 and 132 may be implemented in software or hardware, or software and hardware. Isolators 122, 124, 126, 128, 130 and 132 may also be a combination of electrical and mechanical isolators. The system may include many other isolators than those illustrated in FIG. 2, which may be electrical, mechanical, software and/or any other type of isolator. These other isolators may isolate any component of the hybrid vehicle 100 or any part or feature of any component of the hybrid vehicle 100. For example, other isolators may isolate one or more cylinders from the engine 108, may isolate any portion or battery pack of the battery 106, or may isolate any other part or component utilized in a hybrid vehicle 100.

For example, an isolator may be positioned within a component or part or may be positioned along a connection between the component or part to be isolated and another component or part. Engagement of the isolator prevents or allows, depending on the configuration of the isolator, the connection to remain active. For example, some isolators may cause a connection to become disconnected if the isolator is engaged, and/or some isolators may need to be engaged in order to allow the connection.

Isolators 122, 124, 126, 128, 130, 132 and other isolators, as well as sensors, may be included in the hybrid vehicle's 100 initial design and/or manufacture. They may be included in parts of the various components of the hybrid vehicle 100. They may also be positioned within the hybrid vehicle 100 or any of its components and/or parts at a time after the initial design or manufacture. For example, a battery controller (not shown) may be designed to include overcharge or overheating fault detection of the battery 106, and the electric motor-generator 102 may include a special protection circuit to prevent damage from current and/or voltage spikes.

Isolators 122, 124, 126, 128, 130, 132 and other isolators, may be engaged or disengaged in order to reconfigure the propulsion power generation of the hybrid vehicle 100. For example, mechanical isolator 122 may be engaged in order to isolate/disconnect the engine 108 from the power splitter 118 so that the hybrid vehicle 100 will operate in an electric mode only. Mechanical isolator 124 may be engaged in order to isolate/disconnect the motor-generator 102 from the power splitter 118. Mechanical isolator 126 may be engaged in order to isolate/disconnect the generator 110 from the power splitter 118. Electrical isolator 128 may be engaged in order to disconnect the inverter 104 from the generator 110. Electrical isolator 130 may be engaged in order to isolate/disconnect the inverter 104 from the motor-generator 102. Electrical isolator 132 may be engaged in order to disconnect the battery 106 from the inverter 104.

Other isolators may be engaged and disengaged in order to isolate other components or parts of the hybrid vehicle 100 which are not shown. For example, one or more other isolators within the engine 108 may become engaged in order to disconnect one cylinder from the hybrid vehicle 100 such that the hybrid vehicle 100 can still be propelled by the combustion engine 108 without requiring the isolated cylinder to fire. As another example, other isolators may be utilized within the battery 106 in order to isolate a portion of the battery. For example, the battery may include 4 battery packs. A fault detector may notice a fault or failure in one of the battery packs, and one or more other isolators may be utilized to isolate only that faulted or failed battery pack so that the other battery packs may still be utilized. Other isolators may be utilized in this fashion within any other component or part of the hybrid vehicle 100.

The CPU 119 may be configured to receive fault or failure information, or may be configured to determine a fault or failure based on input from sensors within the hybrid vehicle 100. The CPU 119 may also be configured to cause isolators 122, 124, 126, 128, 130 and 132 or other isolators to engage or to disengage. The CPU 119 may be configured as a redundant component in order to increase robustness against failure of the whole system of the hybrid vehicle 100.

When the CPU 119 receives fault detection information, it may access the memory 120 to retrieve a list of mobility mode configurations. The CPU 119 may determine which mobility modes are available based on the location of the fault or failure and/or the type of fault or failure. The hybrid vehicle 100 also includes a display 134 which may communicate with the CPU 119 in order to display possible mobility modes of the hybrid vehicle 100 which have been determined by the CPU 119. The display 134 may be part of a touch screen system or it may be a stand-alone display, such as a segment display, an LCD display, or any other display mechanism. The display may instead or in addition to the visual display include local or remote audio or tactile interfaces, such that a driver or an operator can be provided visual, audible or tactile data. The display 134 may be dedicated for the hybrid vehicle 100 mode selection systems and methods disclosed herein. The display 134 may be shared between the systems and methods disclosed herein and any other system(s) and/or method(s) of the hybrid vehicle locally or remotely operated at the same time.

If more than one mobility mode is available, the CPU 119 may display a list of all of the possible mobility modes to a user of the hybrid vehicle 100 via the display 134. Possible mobility modes may be defined as any mobility mode in which the combined vehicle propulsion system for that mobility mode can still operate, or can still operate without damage or risk of damage to any part or component, despite any fault and/or failure of any part or component. The CPU 119 may also provide mobility performance parameters such as speed, range, duration, etc.

The user of the hybrid vehicle 100 may select one of the possible mobility modes by utilizing an input 136. The input 136 may be part of the touch screen or it may be a stand-alone input, such as a button or buttons, a touch screen, a potentiometer, or any combination or other input. The input 136 may be dedicated input for the system disclosed in this document or may be shared between this system and any other system(s).

In the case where only one possible mobility mode is available, the CPU 119 may cause the hybrid vehicle 100 to operate in that mobility mode with confirmation from the user, by displaying the information on the display 134 and receiving confirmation through the input 136. The CPU 119 may also cause the hybrid vehicle 100 to operate in that mobility mode without confirmation from the user.

The CPU 119 may also be configured to select a mobility mode without input from a user when more than one mobility mode is possible. For example, the CPU 119 may perform a function, using the fault location and/or type as an input, to determine the best possible mobility mode based on criteria. For example, the criteria may include prevention of damage to a component, prevention of wear and tear of a component, fuel economy, performance, reservation of electrical energy, any other criteria, or any combination of criteria.

In some embodiments, the CPU 119 may present to the user, via the display 134, a list of criteria and allow the user to select one or more criteria that is important to the user. Once the user selects the criteria, the CPU 119 may determine the best possible mobility mode in order to achieve the user-selected criteria. The CPU 119 may then cause the hybrid vehicle 100 to operate in that mobility mode. In other embodiments, the CPU 119 uses preset criteria which may include one or more criteria and/or value indicating the importance of each criterion.

In some embodiments, the CPU 119 may remove one or more mobility modes from the possible mobility modes based on any criteria, and display, via the display 134, the shortened list to the user. In some embodiments, the CPU 119 may present to the user a list of criteria, and based on the user selected criteria, present a shortened list of mobility modes which satisfy the selected criteria. In some embodiments, the user may select more than one mobility mode and request that the CPU 119 determine the best mobility mode from the selections based on either pre-determined or user-selected criteria. In some embodiments, the user may select more than one criterion and provide an importance value to each one.

While this document discusses selection of mobility modes after a fault or failure is detected, one skilled in the art will realize that any of the mobility modes may be selected by a user at any time, not only after a fault or failure is detected. This is beneficial because it will allow the user to operate the hybrid vehicle 100 in any mode he or she desires for any purpose, such as reserving electrical energy or to optimize performance. The ability to cause the hybrid vehicle 100 to operate in a specific mode is helpful for certain other situations. An example of one such situation is where specific components of the hybrid vehicle 100 require diagnosis. In this situation, the CPU 119 may instruct isolators 122, 124, 126, 128, 130 and 132 and/or other isolators to engage or disengage such that only one component or part or a selection of components and/or parts is operational at a single time, allowing for simpler diagnosis. The user may also wish to operate the vehicle in the minimum combustion mode just because the user does not want to put excessive wear and tear on the electric system.

Once a possible mobility mode is selected by the user or the CPU 119, the CPU 119 may cause the hybrid vehicle 100 to operate in that mobility mode. The CPU 119 may cause isolators 122, 124, 126, 128, 130 and 132 and/or other isolators (electrical/electronic, mechanical and/or software based isolators) to engage and/or disengage such that the hybrid vehicle's 100 propulsion system is reconfigured. The CPU 119 may continue to monitor the conditions of the whole system and if the conditions change, the CPU 119 will assist the user by selecting an optimal reconfiguration based on the conditions that the system observed. The CPU 119 may also be configured to estimate failures and/or situations based on the observations and to isolate/disengage components. Isolation/disengagement may occur in order to avoid critical conditions that might occur in the components by sensing heat, pressure, etc.

Figure 3:
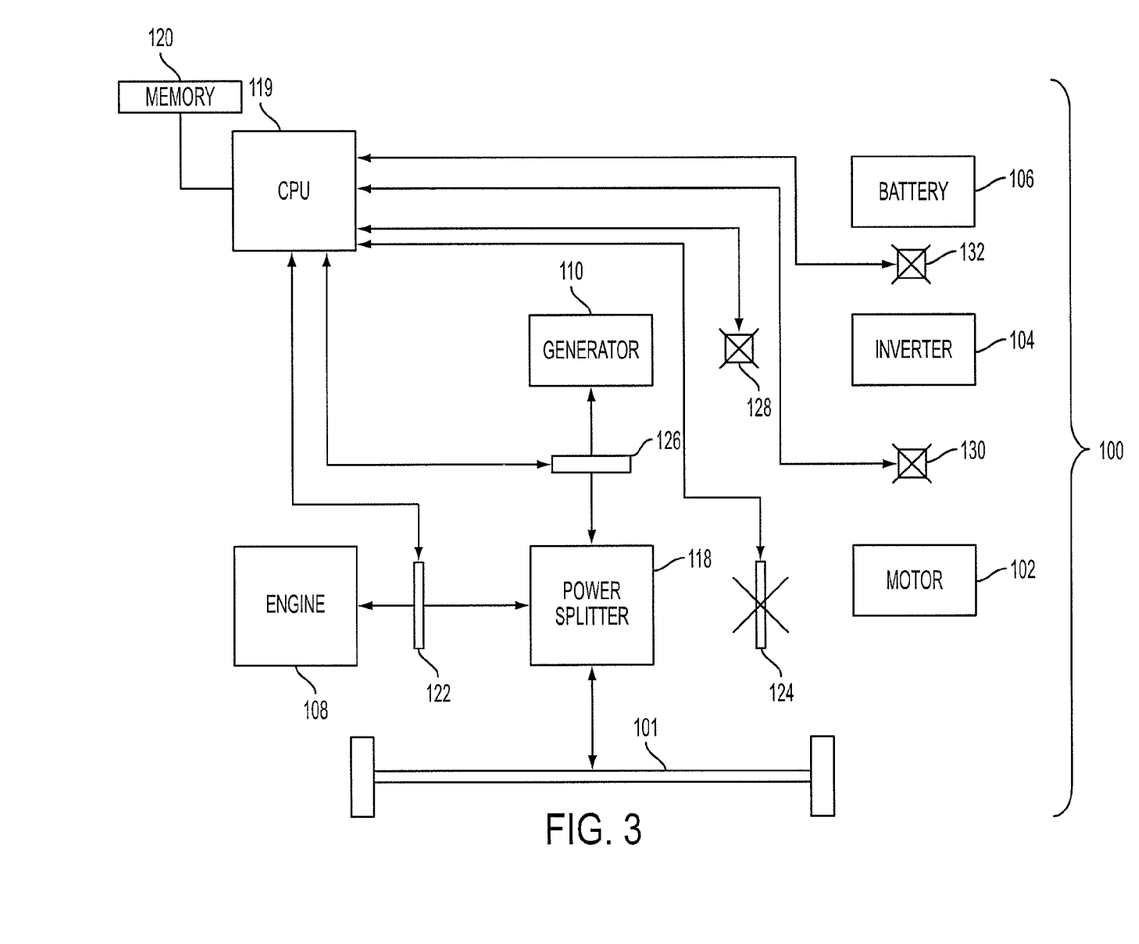
FIG. 3 illustrates an embodiment of a minimum combustion mode of a hybrid vehicle.
Figure 4:
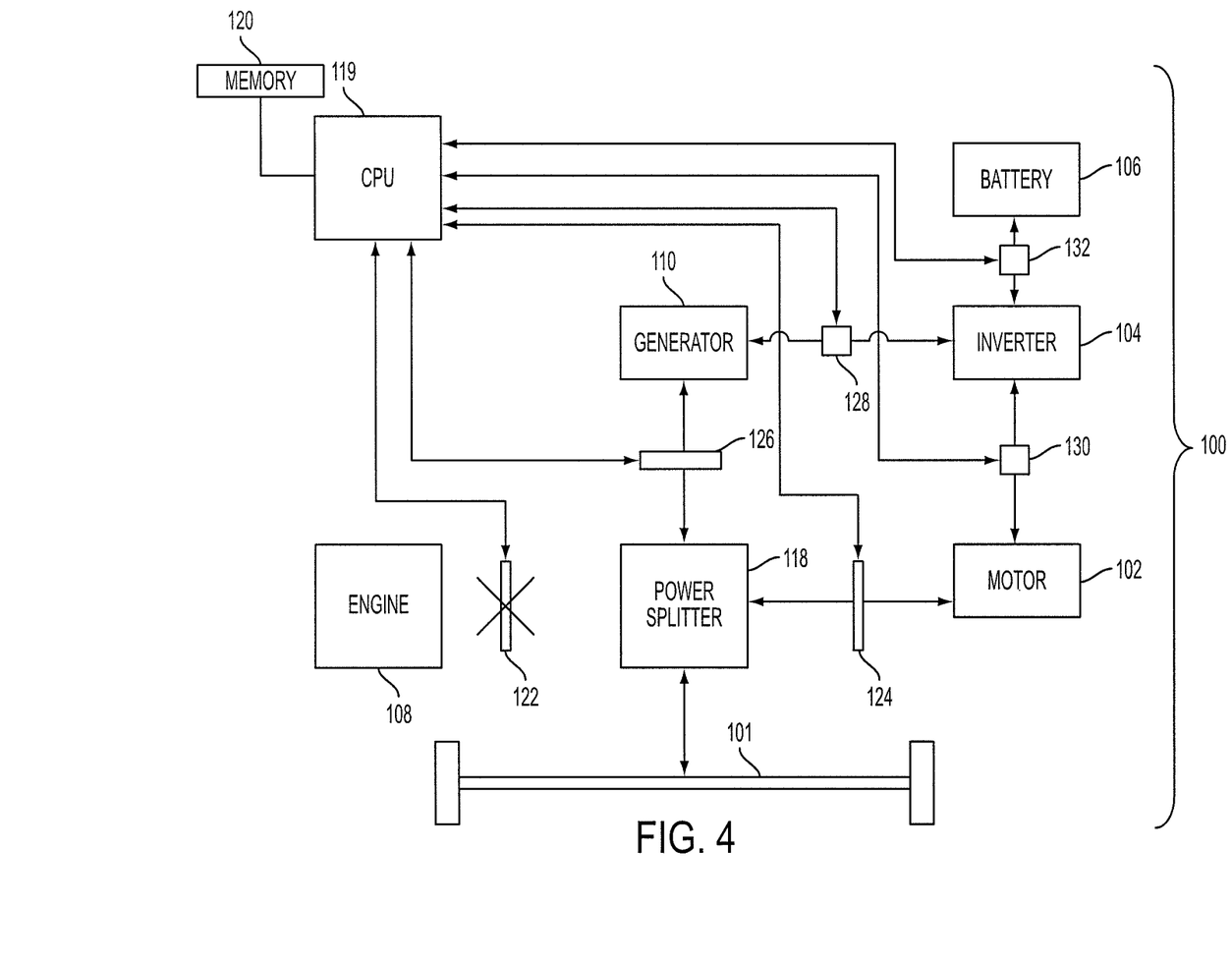
FIG. 4 illustrates an embodiment of a minimum electric mode of a hybrid vehicle.
Figure 5:
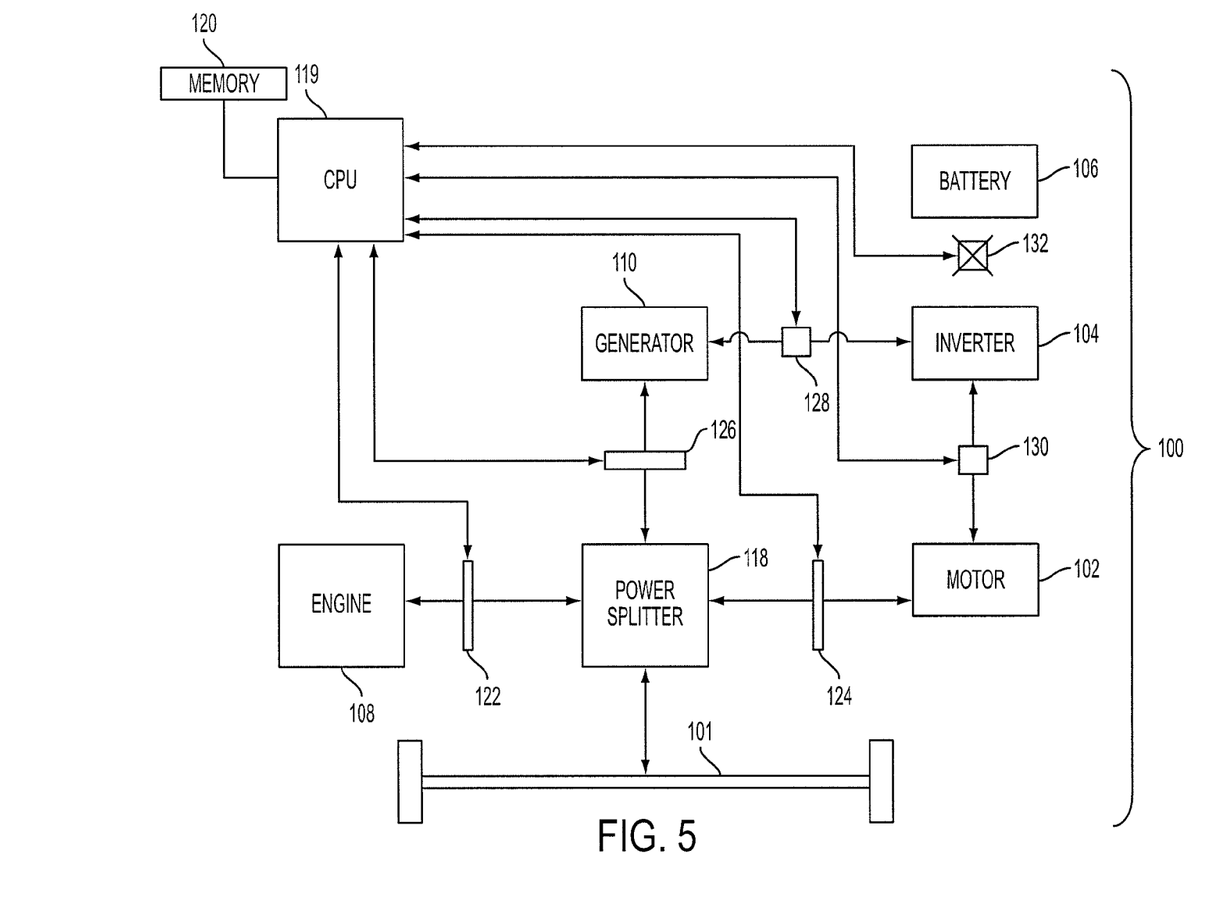
FIG. 5 illustrates an embodiment of a minimum hybrid mode of a hybrid vehicle.

Each mobility mode configuration is a configuration of the propulsion systems of the hybrid vehicle 100. The CPU 119 may be configured to cause the hybrid vehicle 100 to operate in 3 basic minimum mobility modes: minimum combustion mode, minimum electric mode, and minimum hybrid mode. These modes will be illustrated in FIGS. 3, 4, and 5. In FIGS. 3, 4 and 5, connections are only shown between the CPU 119 and the memory 120, as well as through isolators 122, 124, 126, 128, 130 and 132. Other components are still connected to the CPU 119; however the connections are not illustrated so that mobility mode configurations are more clearly visible.

FIG. 3 illustrates an embodiment of a minimum combustion mode of the hybrid vehicle 100. In the minimum combustion mode, the CPU 119 may cause the hybrid vehicle 100 to be powered by the engine 108 only. The minimum combustion mode may be an available mode when the combustion system of the hybrid vehicle 100 is operating properly. For example, a user may wish to operate the hybrid vehicle 100 in the minimum combustion mode when a fault or failure is detected within the battery 106, the inverter 104, the motor-generator 102, or the generator 110, for example.

As illustrated in FIG. 3, in order to cause the hybrid vehicle 100 to operate in the minimum combustion mode, the CPU 119 may cause the mechanical isolator 124 to disconnect the motor-generator 102 from the power splitter 118 so that no energy will be requested of the motor-generator 102 or supplied by the motor-generator 102. The CPU 119 also may engage the electrical isolators 128, 130 and 132 to cause the connections through the isolators 128, 130 and 132 to become disconnected. This results in the motor-generator 102, the inverter 104 and the battery 106 being disconnected from the rest of the hybrid vehicle's 100 propulsion system and therefore reducing the risk of damage or additional damage in the case of a fault or failure.

As illustrated, the mechanical isolator 122 allows the connection between the power splitter 118 and the engine 108 to remain active. In the minimum combustion mode illustrated in FIG. 3, the only propulsion provided to the hybrid vehicle 100 will come from the engine 108.

In other embodiments, the CPU 119 may or may not engage all of the isolators 128, 130 and 132 illustrated as engaged in FIG. 3. For example, the CPU 119 may only cause the motor-generator 102 to become disconnected from the rest of the system and not cause any other component to become disconnected in a minimum combustion mode. The CPU 119 may isolate any single component or any combination of components. Furthermore, any other components not illustrated in FIG. 3 may be caused to be isolated by isolators 122, 124, 126, 128, 130 and 132 and/or other isolators.

FIG. 4 illustrates an embodiment of a minimum electric mode of the hybrid vehicle 100. In the minimum electric mode, the CPU 119 causes the hybrid vehicle 100 to be propelled by the electric system only. The minimum electric mode may be an available mode when the electric system of the hybrid vehicle 100 is operating properly. For example, a user may wish to operate the hybrid vehicle 100 in the minimum electric mode when a fault or failure is detected within the engine 108 or a starter (not illustrated) of the hybrid vehicle 100.

As illustrated in FIG. 4, in order to cause the hybrid vehicle 100 to operate in the minimum electric mode, the CPU 119 causes the mechanical isolator 122 to disconnect the engine 108 from the power splitter 118 so that no energy will be requested of the engine 108. By disconnecting this component, the CPU 119 ensures that these components cannot become damaged or further damaged in the case of a fault or failure.

As illustrated, the electrical isolators 128, 130 and 132 remain active, thus allowing the battery 106 to remain connected to the inverter 104 and the inverter 104 to remain connected to the motor-generator 102. The mechanical isolator 124 allows the connection between the power splitter 118 and the motor-generator 102 to remain active. Additionally, the mechanical isolator 126 allows the connection between the generator 110 and the power splitter 118 to remain active. In the minimum electric mode illustrated in FIG. 4, the only propulsion provided to the hybrid vehicle 100 will come from the electric system.

In FIG. 4, if the generator 110 were to fail or become damaged, the mechanical isolator 126 may engage in order to isolate/disengage the generator 110. In this minimum mode, the motor-generator 102 may be utilized as an alternative generator to the generator 110.

In FIG. 4, the isolator 128 between the inverter 104 and the generator 110 is configured such that the connection is still active. This illustrates that not every part of the combustion system must become completely disconnected from the rest of the hybrid vehicle 100. As the generator 110 is not connected to the power splitter 118, the generator 110 would not be in a position to become damaged or further damaged. As mentioned above, any isolators 122, 124, 126, 128, 130 and 132 and/or other isolators may be engaged and/or disengaged to result in any combination of components and/or parts being connected or disconnected. In other embodiments of a minimum electric mode, the isolator 128 may be engaged such that the inverter 104 is disconnected from the generator 110.

In other embodiments, the CPU 119 may isolate any single component or any combination of components. Furthermore, any other components not illustrated in FIG. 3 may be caused to be isolated by isolators 122, 124, 126, 128, 130 and 132 and/or other isolators by instruction from the CPU 119.

FIG. 5 illustrates an embodiment of a minimum hybrid mode of the hybrid vehicle 100. In the minimum hybrid mode, the CPU 119 may cause the hybrid vehicle 100 to be powered by at least part of the electric system and at least part of the combustion engine system. The minimum hybrid mode may be an available mode when at least a portion of the electric system and at least a portion of the combustion engine system of the hybrid vehicle 100 are operating properly. For example, a user may wish to operate the hybrid vehicle 100 in the minimum hybrid mode when a fault or failure is detected within the battery 106.

As illustrated in FIG. 5, in order to cause the hybrid vehicle 100 to operate in the minimum hybrid mode, the CPU 119 may cause the electrical isolator 132 to disconnect the battery 106 from the inverter 104 so that no component will draw energy from the battery 106. By disconnecting the battery 106, the system ensures that the battery 106 cannot become damaged or further damaged in the case of a fault or failure.

As illustrated, the mechanical isolator 126 and the electrical isolators 128 and 130 remain active, thus allowing the generator 110, the inverter 104 and the motor-generator 102 to remain connected. The mechanical isolators 122 and 124 allow the connections between the power splitter 118 and the motor-generator 102, and between the power splitter 118 and the engine 108, to remain active. In the minimum hybrid mode illustrated in FIG. 5, propulsion may be provided to the hybrid vehicle 100 by the combustion engine system and/or the electric system.

In the minimum hybrid mode, the engine 108 may provide as much power to the hybrid vehicle 100 as is requested of it. The motor-generator 102 may provide energy which is generated by the generator 110. However, the battery 106 is disconnected, so any electric energy used to propel the hybrid vehicle 100 must be used as soon as it is generated by the generator 110. This is advantageous over the minimum combustion mode as it allows the hybrid vehicle 100 to be more energy efficient than if it were operating in a combustion only mode.

The hybrid vehicle 100 may be configured such that there is more than one minimum hybrid mode. For example, if the generator 110 fails or is faulty, the hybrid vehicle 100 can still operate in a minimum hybrid mode. The mechanical isolator 126 and the electrical isolator 128 may become engaged in order to disconnect the generator 110. In this example, the engine 108 can provide power to the hybrid vehicle 100. The motor/generator 102 can also provide power which has been stored as energy in the battery 106 if the isolator 132 remains disengaged. These are just two examples of a minimum hybrid mode, and one skilled in the art will realize that many more minimum hybrid modes exist.

In one embodiment, a failure of the battery 106 will result in at least two possible mobility modes of the hybrid vehicle 100. As the battery 106 is part of the electric system, a fault or failure of the battery 106 does not affect the engine 108. Therefore, the engine 108 may still be utilized to generate energy for propulsion. As mentioned above in reference to FIG. 5, a portion of the electric system may still be utilized for propulsion even if the battery 106 is disconnected. Therefore, the CPU 119 may determine that at least two mobility modes are available when a fault or failure is detected in the battery 106: the minimum combustion mode and the minimum hybrid mode.

As there are at least two possible modes in this example, the CPU 119 may cause the display 134 to display to the user of the hybrid vehicle 100 the possible mobility modes of the hybrid vehicle 100: the minimum combustion mode and the minimum hybrid mode. In response, the user may use the input 136 to select from the possible mobility modes.

In some embodiments, the CPU 119 may determine in which mode the hybrid vehicle 100 will operate when more than one mobility mode is available. The CPU 119 may use any single criteria or combinations of criteria. The factors the CPU 119 may use in making the determination of modes may include fuel economy, wear and tear on hybrid vehicle 100 components, strain on hybrid vehicle 100 components, possibility of damage to hybrid vehicle 100 components, or any other factor.

Let's now assume, for example, that a fault or failure is detected in the engine 108. In this situation, the only possible mobility mode may be the minimum electric mode. In this example, the CPU 119 may automatically cause the hybrid vehicle 100 to operate in the minimum electric mode. The CPU 119 may cause the display 134 to display to the driver that the hybrid vehicle 100 will be operating in the minimum electric mode. In other embodiments, the CPU 119 may cause the display 134 to display to the driver that a failure is detected in the engine and request confirmation before the hybrid vehicle 100 is caused to operate in the minimum electric mode, so that if the user denies confirmation, the current mobility mode is not changed.

In other embodiments, the CPU 119 may cause the display 134 to display the exact fault or failure and/or the exact location of the fault or failure so that the user may determine if the fault or failure is serious enough to cause the component or the propulsion system to become isolated from the rest of the hybrid vehicle 100. This feature can be advantageous if the fault in the engine 108 is a minor fault. If the battery 106 is low on charge, the user may determine that it is better to risk minor damage to the engine 108 while retaining the ability to travel.

In some embodiments, the system is configured such that isolators 122, 124, 126, 128, 130 and 132 and/or other isolators may isolate only portions of the combustion system or the electric system such that a portion of either or both systems may generate energy to propel the hybrid vehicle 100.

Figure 6:
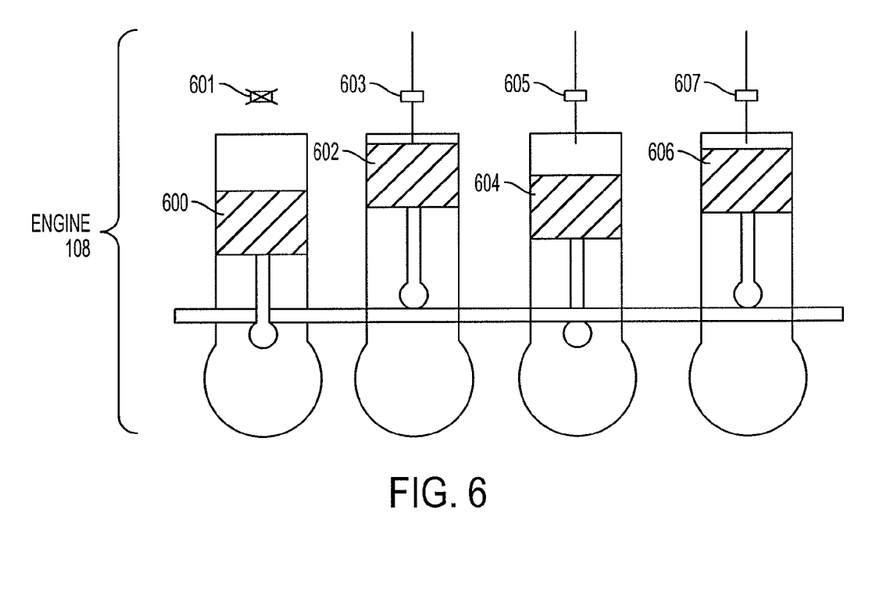
FIG. 6 illustrates an embodiment of a backup combustion mode of a hybrid vehicle.

FIG. 6 illustrates an embodiment of a backup combustion mode. In FIG. 6, 4 cylinders 600, 602, 604 and 606 are illustrated. Let's assume that a sensor coupled the cylinder 600 transmits measurements to the CPU 119. The CPU 119 may compare the measurement to a range of expected values in the memory 120, and may determine that the measurement is not within the range of expected values. Based on the location of the measurement and the value of the measurement, the CPU 119 may determine that the fault is associated with a faulty ignition system of the cylinder 600 (resulting in incomplete combustion). In this example, incomplete combustion could potentially damage an expensive catalytic converter (not shown) in an emission control system (not shown) of the hybrid vehicle 100. The CPU 119 may access information in the memory 120 to determine that in this situation, the cylinder 600 should be isolated from the rest of the parts of the engine and/or the rest of the components of the hybrid vehicle 100.

The CPU 119 may determine different possibility modes. For example, the CPU 119 may protect the catalytic converter by completely isolating, or giving the user the option to isolate, the combustion system, as illustrated in FIG. 4. However, the hybrid vehicle 100 may be configured such that each cylinder 600, 602, 604 and 606 is connected to at least one other isolator 601, 603, 605 and 607 such that each cylinder 600, 602, 604 and 606 can be isolated from the rest of the combustion system. In this example, the CPU 119 may deactivate the misfiring cylinder by engaging the isolator 601 associated with the cylinder 600. The isolator 601 may be an electrical isolator used to disconnect the ignition circuit. This embodiment may also include a software isolator to command the electrical isolator to engage.

With only the one cylinder 600 isolated, the hybrid vehicle 100 may operate in a backup combustion mode, which is a mode wherein vehicular propulsion is generated by the other cylinders 602, 604 and 606 of the engine 108. The hybrid vehicle 100 may also operate in a minimum electric mode by isolating the entire engine 108. The hybrid vehicle 100 may also operate in a backup combustion hybrid mode, with the electric system being fully operational and the non-misfiring cylinders 602, 604 and 606 being operational. In this situation, the CPU 119 may present, on the display 134, the user of the hybrid vehicle 100 these three possible mobility modes. The user may then select one of the mobility modes using the input 136, or the CPU 119 may select one of the mobility modes based on predetermined or user selected criteria. More possible mobility modes may exist in this scenario.

Possible mobility modes can further include a portion of the combustion system even if the entire combustion system is operating. For example, the user of the hybrid vehicle 100 may wish to operate the combustion system at half power. This can be performed, for example, by utilizing only 2 cylinders (such as cylinders 600 and 602) and isolating 2 cylinders (such as cylinders 604 and 606). When selecting possible mobility modes in this scenario, the user may also have the option to select a backup combustion only mode, where the two cylinders 604 and 606 are isolated. The user may also select a backup combustion hybrid mode in which the two cylinders 604 and 606 of the engine are isolated and the other two cylinders 600 and 602, as well as the electric system, are operational.

Figure 7:
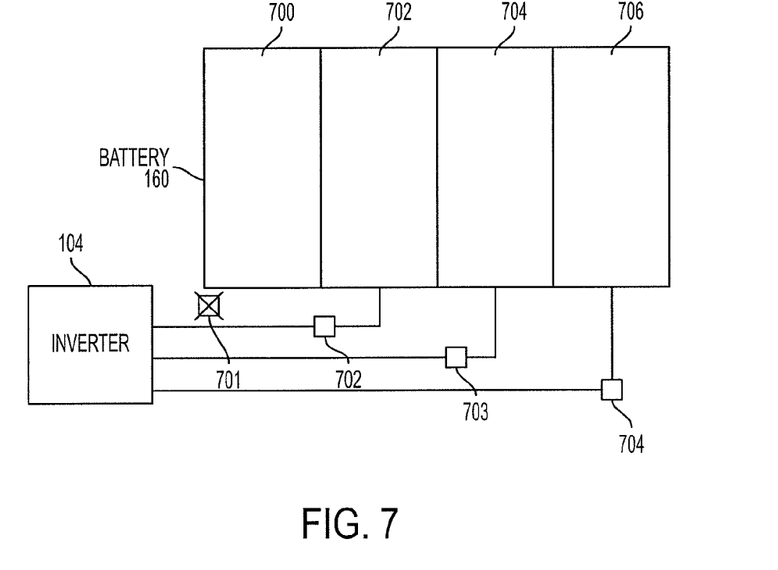
FIG. 7 illustrates an embodiment of a backup electric mode of a hybrid vehicle.

FIG. 7 illustrates an embodiment of a backup electric mode. In FIG. 7, the battery 160 includes battery packs 700, 702, 704 and 706. If a fault is detected in one of the battery packs 700, the other battery packs 702, 704 and 706 may still store and distribute energy to be used by the electric system. In this example, a sensor may be coupled to each battery pack 700, 702, 704 and 706 to sense voltage, current, temperature, state of charge, or any other measurement associated with the battery pack 700, 702, 704 and 706. The sensor may also be coupled to the CPU 119. After receiving a non-expected value in a measurement from the battery pack 700, the CPU 119 may determine that the battery pack 700 has failed.

In this example, the hybrid vehicle 100 may operate in a backup electric mode. This mode is achieved by the CPU 119 instructing isolator 701 within the battery 106 to engage to cause the faulty battery pack to become disconnected. Other isolators 703, 705 and 707 remain disengaged, allowing the connections to remain intact. In the backup electric mode, the hybrid vehicle 100 is powered by the electric system with only the faulty battery pack 700 being disconnected. The hybrid vehicle 100 may also operate in a minimum combustion mode, such as that illustrated in FIG. 3. The hybrid vehicle 100 may also operate in a minimum hybrid mode, such as that illustrated in FIG. 5. The hybrid vehicle 100 may also operate in a backup electric hybrid mode, where the hybrid vehicle 100 is powered by the engine 108 as well as the electric system without the isolated battery pack 700.

The example discussed previously (wherein all of the hybrid vehicle's 100 components except for the generator 110 are operating to power the hybrid vehicle 100) may be considered a backup electric hybrid mode instead of or in addition to a minimum hybrid mode as discussed above. In this example, the hybrid vehicle 100 may be propelled by energy stored in the battery 106 and/or by the engine 108, without the generator 110 generating energy.

As shown in the previous examples, depending on the location of a fault, the hybrid vehicle 100 may operate in many possible mobility modes. The memory 120 may store all of the possible mobility modes of the hybrid vehicle 100, including a list of components and portions of components that are required for each mobility mode to be operable. When a fault is detected within the hybrid vehicle 100, the CPU 119 may retrieve all of the possible mobility modes of the hybrid vehicle 100 from the memory 120. The CPU 119 may then compare the location of the fault and/or the type of fault to each of the mobility modes to determine which mobility modes may be used without the faulty component or part (in other words, the possible mobility modes). When the CPU 119 determines the available mobility modes, it may present these modes to a user via the display 134 so that the user can select the mode.

In some embodiments, the CPU 119 may also cause the display 134 to display the faulty or failed part and/or the type of fault so that the user may make a more educated choice of mobility modes. In some embodiments, the CPU 119 may only display the faulty part and/or the type of fault, and/or the component in which the part is situated, to the user and give the user the option to remove the part or component from operation. For example, if the user has caused the hybrid vehicle 100 to operate in a hybrid mode and a fault is detected in a cylinder 600, the user may select for only the cylinder 600 to become disconnected or the engine 108 to become disconnected. This results in the hybrid vehicle 100 operating in the backup combustion hybrid mode or the minimum electric mode.

Figure 8:
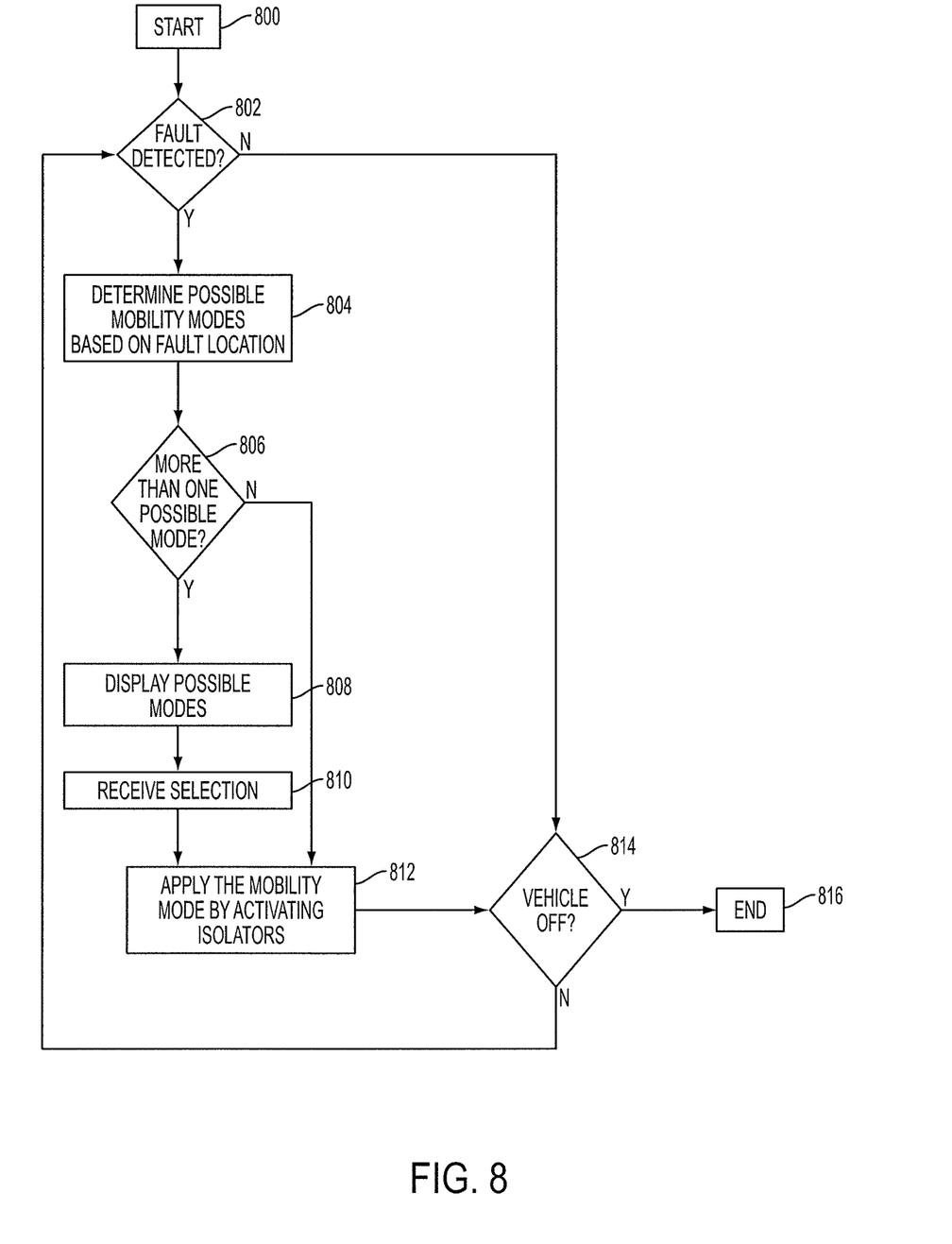
FIG. 8 is a flow chart illustrating a method for reconfiguring a hybrid vehicle with a minimum mobility mode.

FIG. 8 is a flow chart illustrating a method for reconfiguring a hybrid vehicle with a minimum mobility mode. The process begins at block 800. In block 802, it is determined whether a fault is detected. These faults are detected by sensors coupled to one or more logic devices, such as the CPU 119. The sensors provide measurements to the logic device, which uses the measurements as inputs for a logic function. Based on the result of the logic function, a fault may or may not be indicated. The logic device may also be configured to determine the location of all of the sensors and interpret the result of the logic functions, so that the CPU 119 may determine the location of the fault and the type of the fault.

If a fault is detected, in block 804, the possible mobility modes of the hybrid vehicle 100 are determined. This determination is based on the location of the fault and/or the type of fault. As mentioned above, some possible mobility modes are the minimum electric mode, the minimum combustion mode, the minimum hybrid mode, the backup combustion mode, the backup electric mode, the backup electric hybrid mode and the backup combustion hybrid mode. One skilled in the art will realize that different embodiments exist for each of these mobility modes.

In block 806 it is determined whether there is more than one possible mobility mode based on the location and/or type of the fault. In block 808, if there is more than one possible mobility mode, these possible modes are displayed to a user of the hybrid vehicle 100 on the display 134. As the display 134 can also include audio or tactile interfaces, data regarding the possible modes may also be provided to the user through an audio or tactile interface. CPU 119 may also cause the display 134 to display a list of criteria to the user so that the user can select criteria for mode selection and the CPU 119 can determine the best mode based on the criteria.

In block 810, a selection of one of the possible mobility modes is received. As described above, a user of the hybrid vehicle 100 may select from the list of possible mobility modes. In other embodiments, the CPU 119 may select the mobility mode based on predetermined criteria, such as possibility of component damage, fuel economy, etc., as described above.

In some embodiments, the CPU 119 may be required to isolate a faulty or failed part before a user has time to select a mobility mode. For example, a situation may arise where a part will be severely damaged if it is not isolated immediately. The CPU 119 may be configured to determine information such as this, and to cause another mobility mode to be applied as soon as this determination is made. In this situation, the CPU 119 may cause the other mobility mode to be applied to the hybrid vehicle 100 and then present the possible mobility modes to the user via the display 134, such that the user may select another mobility mode and the CPU 119 may then cause that mobility mode to be applied. In some embodiments, the CPU 119 uses predetermined criteria (either programmed or selected by the user beforehand) to select the mobility mode of the vehicle in this type of situation.

In block 812, the selected mobility mode is applied to the hybrid vehicle 100. The mobility mode is applied by engaging or disengaging isolators 122, 124, 126, 128, 130 or 132 and/or other isolators throughout the hybrid vehicle's 100 electric system and combustion system.

In block 814 it is determined whether or not the hybrid vehicle 100 is still in an on position. If the hybrid vehicle 100 is still in the on position, the process returns to block 802 to determine whether or not a fault is detected. If the hybrid vehicle 100 is turned off, the process ends at block 816.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions. It will also be apparent that any ordered process discussed herein may be performed in an order other than that which was discussed.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for reconfiguring the operations of a vehicle comprising:
    detecting, using a sensor, a fault of a component that is associated with electric propulsion of the vehicle or combustion engine propulsion of the vehicle;
    providing, using a processor, a plurality of modes of operation for the vehicle, the plurality of modes of operation including an engine only mode, an electric only mode, a hybrid mode, a backup combustion mode, a backup electric mode and a backup hybrid mode;
    displaying, using a display screen, at least two of the plurality of modes of operation that avoid use of the faulty component;
    receiving, using the processor, a selection of one of the at least two of the plurality of modes of operation that are displayed on the display screen; and
    activating, using the processor, at least one electric, mechanical or software isolator to isolate or disengage at least one component associated with electric propulsion of the vehicle that includes the faulty component or at least one component associated with combustion engine propulsion of the vehicle that includes the faulty component.

2. The method of claim 1 wherein the sensor is at least one of a digital thermometer, an analog thermometer, a thermocouple, an ohmmeter, a voltmeter, an ammeter, an alternating current signal sensor, a capacitance sensor, an inductance sensor, a pressure sensor, a microphone, an air-fuel ration meter, a crankshaft position sensor, a hall effect sensor, a manifold absolute pressure sensor, a mass flow sensor, an oxygen sensor, a throttle position sensor, a torque sensor, a turbine speed sensor, a variable reluctance sensor, a water sensor, a state of charge sensor, a motion sensor, or a microphone.

3. The method of claim 1 wherein the faulty component is one of a battery, a battery pack, an inverter, a motor, a generator, an engine or a starter or is associated with an engine cylinder.

4. The method of claim 1 wherein the backup hybrid mode includes at least one of an isolated battery, an isolated engine cylinder or an isolated generator.

5. The method of claim 1 wherein the backup combustion mode includes an isolated engine cylinder.

6. The method of claim 1 wherein the components associated with electric propulsion of the vehicle include a battery, an inverter, a motor and a generator.

7. The method of claim 1 wherein the components associated with combustion engine propulsion include an internal combustion engine.

8. The method of claim 1 wherein the at least one isolator includes at least one of a mechanical isolator between an engine of the vehicle and an axle of the vehicle, a mechanical isolator between a motor-generator of the vehicle and an axle of the vehicle, an electrical isolator between a generator of the vehicle and the axle of the vehicle, or an electrical isolator between a battery of the vehicle and the motor-generator of the vehicle.

9. The method of claim 1 wherein providing the plurality of modes of operation for the vehicle includes retrieving the plurality of modes of operation for the vehicle from a memory.

10. A system for reconfiguring the operations of a vehicle comprising:
    a sensor for detecting a fault of a component that is associated with electric propulsion of the vehicle or combustion engine propulsion of the vehicle;
    a display screen; and
    a processor configured to:
        provide the plurality of modes of operation for the vehicle, the plurality of modes of operation including an engine only mode, an electric only mode, a hybrid mode, a backup combustion mode, a backup electric mode and a backup hybrid mode,
        instruct the display screen to display at least two of the plurality of modes of operation that avoid use of the faulty component,
        receive a selection of one of the at least two of the plurality of modes of operation that are displayed on the display screen, and
        activate at least one electric, mechanical or software isolator to isolate at least one component associated with electric propulsion of the vehicle that includes the faulty component or at least one component associated with combustion engine propulsion of the vehicle that includes the faulty component.

11. The system of claim 10 wherein the sensor is at least one of a digital thermometer, an analog thermometer, a thermocouple, an ohmmeter, a voltmeter, an ammeter, an alternating current signal sensor, a capacitance sensor, an inductance sensor, a pressure sensor, a microphone, an air-fuel ration meter, a crankshaft position sensor, a hall effect sensor, a manifold absolute pressure sensor, a mass flow sensor, an oxygen sensor, a throttle position sensor, a torque sensor, a turbine speed sensor, a variable reluctance sensor, a water sensor, a state of charge sensor, a motion sensor, or a microphone.

12. The system of claim 10 wherein the faulty component is one of a battery, a battery pack, an inverter, a motor, a generator, an engine or a starter, or is associated with an engine cylinder.

13. The system of claim 10 wherein the backup hybrid mode includes an isolated battery, an isolated engine cylinder or an isolated generator.

14. The system of claim 10 wherein the backup combustion mode includes an isolated engine cylinder.

15. The system of claim 10 wherein the components associated with electric propulsion of the vehicle include a battery, an inverter, a motor and a generator.

16. The system of claim 10 wherein the components associated with combustion engine propulsion include an internal combustion engine.

17. The system of claim 10 wherein the at least one isolator includes at least one of a mechanical isolator between an engine of the vehicle and an axle of the vehicle, a mechanical isolator between a motor-generator of the vehicle and an axle of the vehicle, an electrical isolator between a generator of the vehicle and the axle of the vehicle, or an electrical isolator between a battery of the vehicle and the motor-generator of the vehicle.

18. The system of claim 10 further comprising a memory configured to store the plurality of modes.

19. A method for reconfiguring the operations of a vehicle comprising:
   detecting, using a sensor, a fault of a component that is associated with a first propulsion system of the vehicle or a second propulsion system of the vehicle;
   providing, using a processor, a plurality of modes of operation for the vehicle, the plurality of modes of operation including a first propulsion system only mode, a second propulsion system only mode, a backup first propulsion system mode, a backup second propulsion system mode, and a backup hybrid propulsion system mode of the first propulsion system and the second propulsion system;
   displaying, using a display screen, at least two of the plurality of modes of operation that avoid use of the faulty component;
   receiving, using the processor, a selection of one of the at least two of the plurality of modes of operation that are displayed on the display screen; and
   activating, using the processor, at least one electric, mechanical or software isolator to isolate at least one component associated with the first propulsion system of the vehicle or at least one component associated with the second propulsion system of the vehicle that includes the faulty component.

20. The method of claim 19 wherein the first propulsion system of the vehicle includes combustion engine propulsion or electric propulsion and the second propulsion system of the vehicle includes fuel cell propulsion.

* * * * *